J. H. WAGENHORST.
VEHICLE WHEEL RIM.
APPLICATION FILED MAR. 25, 1915.
1,233,283.
Patented July 10, 1917.
2 SHEETS—SHEET 1.
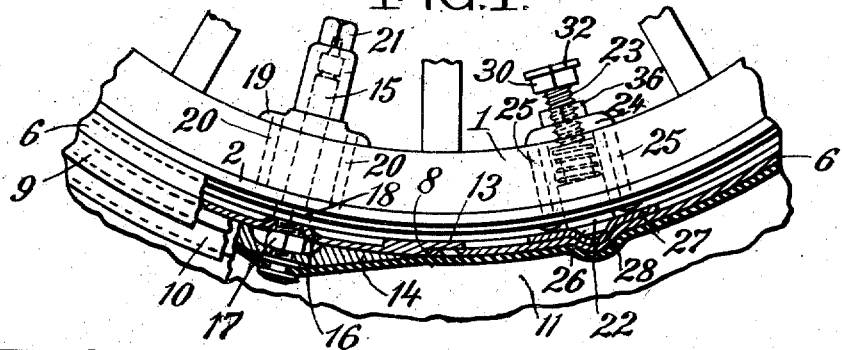
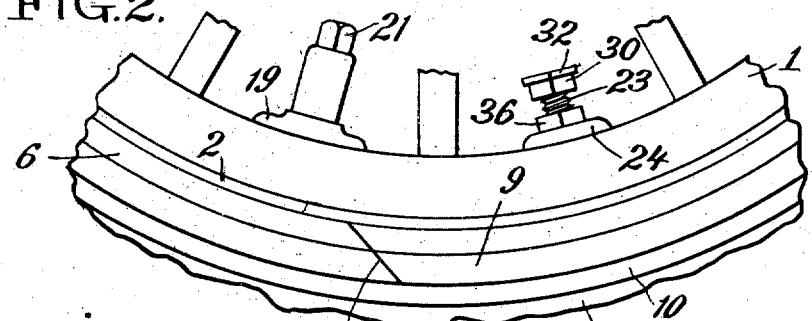
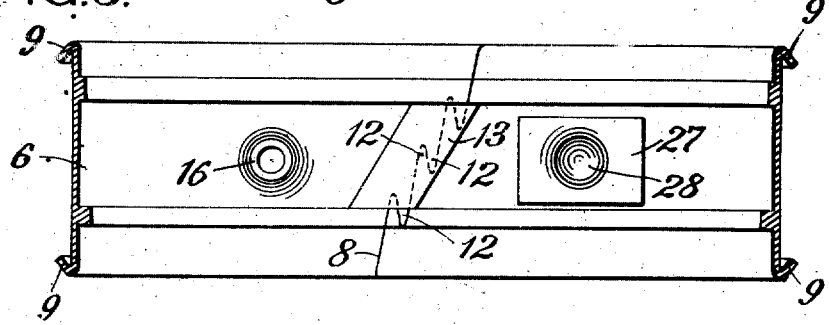
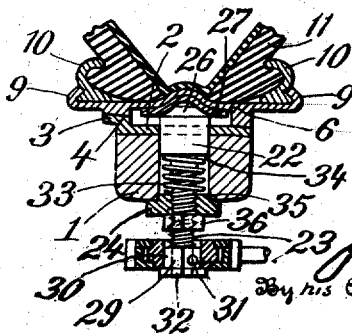
Inventor
James H. Wagenhorst
By his Attorney
Seward Davis

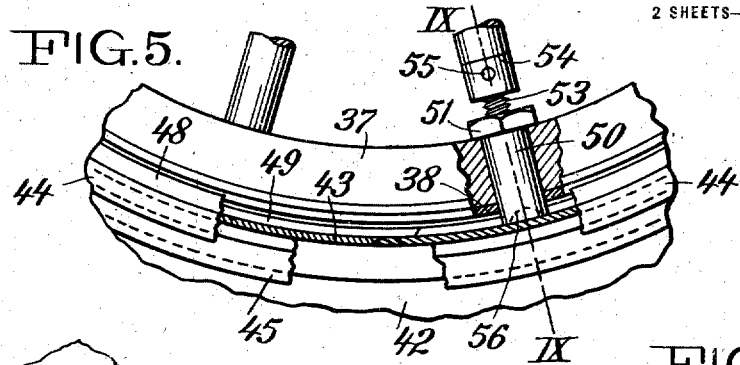
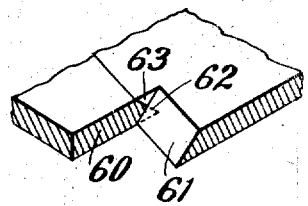
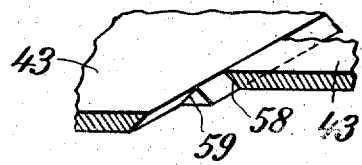
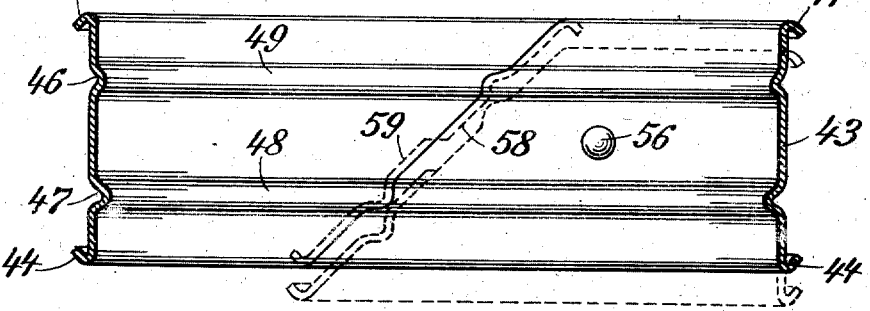
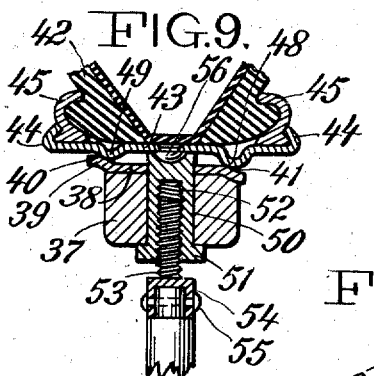
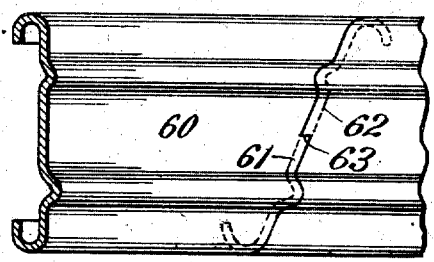
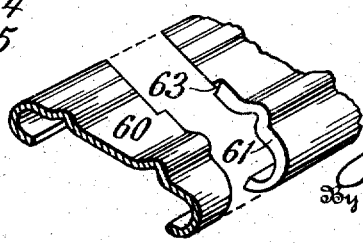

UNITED STATES PATENT OFFICE.

JAMES H. WAGENHORST, OF AKRON, OHIO, ASSIGNOR OF ONE-FIFTH TO THE GOODYEAR TIRE & RUBBER COMPANY, A CORPORATION OF OHIO, ONE-FIFTH TO THE UNITED STATES TIRE COMPANY, A CORPORATION OF NEW YORK, AND TWO-FIFTHS TO THE B. F. GOODRICH COMPANY, A CORPORATION OF NEW YORK.

VEHICLE-WHEEL RIM.

1,233,283.     Specification of Letters Patent.     Patented July 10, 1917.

Continuation in part of application Nos. 702,851 and 702,854, filed June 10, 1912. This application filed March 25, 1915. Serial No. 16,830.

*To all whom it may concern:*

Be it known that I, JAMES H. WAGENHORST, a citizen of the United States, residing in the city of Akron, county of Summit, and State of Ohio, have invented certain new and useful Improvements in Vehicle-Wheel Rims, of which the following is a specification.

This invention relates to improvements in vehicle wheel rims of the class designed to carry a pneumatic or other resilient tire. The invention includes an improved form of demountable tire-carrying structure comprising a transversely split tire-carrying rim and features permitting the ready mounting and dismounting of the rim, consisting in part of rigidly mounted members formed preferably integral with the rim ends, whose interlocking engagement prevents the accidental separation of the rim ends both circumferentially and radially, in either direction, but permits their mutual engagement or disengagement by the relative lateral movement of the rim ends as desired. The nature of these improvements will be fully set forth in the following detailed description and the appended claims:

The present application relates to certain inventions fully set forth in my co-pending applications Serial No. 702,851 and Serial No. 702,854, both filed June 10, 1912, (Patents Nos. 1,136,984 and 1,160,224, respectively,) of which said applications this is a continuation, the present application containing no matter not found in one or the other of the said co-pending applications as originally filed.

In the accompanying drawings which form a part of this specification, Figure 1 is a side elevation of a part of a wheel felly having one of my improved rims applied thereto, a portion of the tire-carrying rim and associated parts being shown in circumferential section; Fig. 2 is a side elevation corresponding to Fig. 1, showing the latter without sectional portions; Fig. 3 is a bottom plan view of a portion of the rim base of the tire-carrying rim removed from the wheel and showing the transverse joint therein; Fig. 4 is a transverse section through the wheel felly and rim showing one of the radial securing bolts and illustrating in cross-section the socket of a form of wrench used in connection therewith; Fig. 5 is a side elevation of a portion of a wheel with a modified form of rim thereon, a part of the rim and felly being broken away to show one of the radial securing bolts passing through the felly; Fig. 6 is a fragmentary sectional perspective view of a portion of the rim base shown in Fig. 11 and bearing substantially the same relationship thereto that Fig. 8 bears to Fig. 7; Fig. 7 is a bottom plan view of a portion of the rim base showing the modified transverse split therein, the dotted line showing the position into which one end of the rim base is moved to disengage the ends of the rim base and permit it to be collapsed; Fig. 8 is a fragmentary sectional perspective view of a portion of the rim base corresponding to a portion of Fig. 7; Fig. 9 is a transverse section on the line IX—IX of Fig. 5; Fig. 10 is a plan view of the under-side of another modified form of tire-carrying rim showing the transverse split therein, and Fig. 11 is a perspective view of a portion of the tire-carrying rim shown in Fig. 10, the ends of the rim being shown separated longitudinally.

Referring to the drawings in detail, and particularly to Figs. 1 to 4, the numeral 1 designates the felly of a wheel, which, if of wood, is preferably provided with an endless metallic felly band 2 permanently secured thereto by shrinking or otherwise. The felly band 2 is provided with bearing surfaces for engagement with complementary bearing surfaces upon the tire-carrying rim, one of these bearing surfaces 3 being preferably formed upon a flange 4 so as to have a greater diameter than the bearing surface 5 formed at the opposite edge of the felly band. As will be understood, if the material of the felly 1 is suitable, the bearing surfaces may be formed directly thereon and the separate felly band 2 dispensed with. One form of such construction is shown in my co-pending application noted above, Serial Number 702,851. The surfaces 3 and 5 are preferably inclined slightly in the same general direction although this is not essential. 6 is the tire-carrying rim, which may be of any suitable construction. As illustrated in Figs. 1 to 4, inclusive, it comprises a rim base 7 transversely split at 8 and having inwardly hooked flanges 9 at its edges. The flanges 9 engage the endless tire-retaining flanges 10 which retain the beads of the tire 11. As illustrated, the flanges 10 are reversible, so that the rim may be used to carry either a tire of clencher form or a straight-sided tire. As shown in Fig. 3, the line of the split 8 is preferably zig-zag, proceeding from a point on the edge of the rim to a circumferentially advanced point on the other edge of the rim, so as to provide the interlocking teeth 12 which prevent circumferential expansion of the rim. One end of the rim base may carry a plate 13 which extends slightly under the opposite end of the rim base, this plate preventing the inward movement of the end of the rim base overlapping the same. The general direction of the split in the rim base is preferably at an angle to its edges the axis of symmetry of the split being preferably diagonal, the edge of the plate 13 being inclined at a similar angle, as shown in Fig. 3. The split is also preferably formed upon an angle to a radius of the wheel, as shown in Figs. 1 and 2, the beveled end of the rim base carrying the plate 13 being arranged to overhang the other end of the rim base, so that the end carrying the plate 13 cannot be moved radially inward with relation to the opposite end. It will thus be seen that the ends of the rim base are adapted to mutually interengage and the face of each end comprises intersecting planes angularly disposed with respect to adjacent axial planes. Thus the ends are normally locked against radial displacement and against circumferential displacement. The ends of the rim may be disengaged by displacing them laterally until the edge of the plate 13 clears the ends of the tongues 12 on the opposite end of the rim, when such opposite end may be depressed and telescoped beneath the end of the rim carrying the plate. The rim may then be contracted sufficiently to permit the flanges 10 and the tire to be readily removed. The flanges 10 normally prevent the lateral displacement of the ends of the rim base as they are forced firmly beneath the inwardly hooked flanges 9 when the tire is inflated, and will be held in such position even when the tire is not inflated by the clip 14 carried by the valvestem 15. The valvestem is preferably located near the point where the rim is split, as shown in Figs. 1, 2 and 3. The ends of the split rim base are thus normally firmly held against displacement in any direction and the rim is as strong as an endless rim. The ends may be readily disengaged, however, by deflating the tire and pushing up the valve clip by means of the valvestem, thus permitting the rim base to be collapsed and the endless flanges and tire to be removed.

In forming an opening through the rim base for the valvestem, I preferably draw up the metal around the opening into a sort of bell mouth or flange 16, clearly shown in Fig. 1. This flange may be formed without difficulty during the punching of the opening through the rim base. It serves to facilitate the application of a tire to the rim base by guiding the valvestem through its opening. It will also receive the edge of the nut 17 which is screwed on the valvestem to hold the clip in position, thus permitting the clip to seat firmly upon the rim base, although this nut 17 may project slightly below the same. The edge of the flange 16 forms a seat for a nut 18 which may be screwed on the valvestem to draw the clip down upon the rim base and thus wedge the beads of the tire against the flanges 10 and hold them separated, thus preventing the lateral displacement of the ends of the rim base, as above specified. The valvestem 15 is preferably inclosed in a valve cap. The latter may screw upon the valvestem in the usual manner, although I prefer to attach the same to the wheel independently of the valvestem, so that the rim and tire may be removed from the wheel without removing the valve cap, if desired. In accordance with my invention I attach a plate 19 to the inner surface of the wheel felly in any suitable manner, as by means of the screws 20 passing through the felly and felly band and screwing into this plate. The plate is provided with an opening therethrough into which the end of the valve cap passes and to which it may be attached. The valve cap may be provided with a squared end 21 or other suitable means for turning the same.

The removable tire-carrying rim is preferably locked upon the wheel by means of a plurality of radial studs 22. These studs slide in holes in the felly and are provided with screw-threaded stems 23 which screw through plates 24 secured to the under-surface of the felly. I prefer to form these plates as shown in Fig. 1, with integral prongs or rods 25 turned up at each end, such rods passing through holes in the felly and the felly band and riveted to the latter. The plates may be easily and cheaply constructed in this form and are very strong, the pressure of the studs being transmitted directly through the plates to the felly band of the wheel. The radial studs 22 have their ends formed to engage the rim in such manner as to prevent lateral and circumferential movement of the rim upon the wheel. I prefer to form the ends of these studs with a concave tapering bearing surface 26 which is adapted to fit the natural roll formed by stamping a rounded depression in the rim base. Such a depression may be stamped with the least injury to the surrounding metal and with the simplest dies and by properly shaping the end of the radial stud an extended bearing surface is obtained. The stud at the same time has a tapered end adapted to guide the rim into alinement with the wheel. I preferably reinforce the sockets formed in the rim for the reception of these radial studs by welding or brazing wear plates 27 to the under-surface of the rim, these being depressed as indicated at 28 to conform to the depressed sockets in the rim.

The extreme ends of the radial studs are flattened, while the depressions formed in the rim and wear plates are rounded, so that a slight clearance is left between the flattened ends of the bolts and the bottoms of the sockets in the wear plates. This avoids the necessity of carefully conforming the ends of the bolts to the shape of the sockets and eliminates the danger of the whole pressure of any stud being concentrated upon a small area at the extreme end thereof. For rotating the studs, any suitable means may be employed, but as shown in the drawings, the end of the stem of each stud is squared, as indicated at 29, and a faceted head 30 secured to such squared end in any suitable manner, as by means of a pin 31. I have shown the heads 30 provided at their lower ends with narrow flanges 32 of similar outline to the heads, both the heads and flanges being square, as illustrated in the drawings. The flanges 32 are to retain a wrench applied to the heads for rotating the same. The wrench shown in one of my co-pending applications above referred to namely, Ser. No. 702,851, filed June 10, 1912, is adapted for use in connection with the radial bolts and associated parts just described.

When the radial studs are forced out the tapered ends thereof are caused to engage the sockets in the under-surface of the rim, the tapered shape of the ends of the studs acting to insure accurate alinement of the rim upon the wheel felly. Further rotation of the studs forces the bearing surfaces of the rim away from the bearing surfaces of the felly band adjacent to the studs, thus distorting the rim slightly out of true circular configuration and drawing the portions of the rim between adjacent studs into close contact with the bearing surface of the felly band. The rim is then caused to grip the wheel throughout the greater part of its periphery and a very solid bearing of the rim upon the wheel is obtained. The distortion of the rim is not sufficient to affect the running qualities of the wheel.

For preventing accidental rotation of the studs, I may use any suitable means, for example, spiral spring lock washers 33. These lock washers may be inserted in the holes in the felly through which the studs pass, one end of the lock washer bearing against the shoulder 34 formed by the end of the main body of the stud, while the other end of the lock washer rests upon the surface of the boss 35, projecting from the plate 24 and received in the end of the opening through the felly. By making the lock washer of a spring of several convolutions, it will follow the shoulder 34 throughout the travel of the radial stud and will thus serve to lock the stud against accidental displacement when in any position. The lock washer, owing to its position in the hole in the felly, is protected from injury and concealed from view, so that the neat appearance of the wheel is not detracted from.

Either in addition to the lock washers 33, or in place of the same, I may use lock nuts 36 screwing on the stems of the studs. The nuts 36 are preferably used whether the lock washers 33 are used or not, as in addition to their function as lock nuts, they serve to limit the outward radial movement of the studs. The lock nuts preferably fit the screw-threaded stems of the studs somewhat tightly, so that they will normally remain stationary upon such stems. They thus serve to limit the outward movement of the studs when the latter are operated by means of the wrench, and thus prevent one stud from being forced out farther than the others, which would result in mounting the rim eccentrically upon the wheel. The nuts 36, if required to be loosened or adjusted in position upon the stems of the studs, may be operated by an ordinary wrench, or, as indicated in my co-pending application above referred to, may be adjusted by the wrench there shown.

Referring now to the modification shown in Figs. 5 to 9, inclusive, there is shown a vehicle wheel having spokes and a felly 37. If the felly is of wood, it preferably has shrunk upon its periphery a metallic felly band 38 which is provided with bearing surfaces to be engaged by the bearing surfaces of the removable tire-carrying rim. The bearing surfaces of the wheel are preferably of different diameters. As illustrated in the drawings, the felly band 38 has at one side a raised outwardly curved flange 39, the upper surface of which forms a convex bearing surface 40, while at the opposite edge the felly band 38 is bent downward to provide a concave bearing surface 41. 42 is the tire-carrying rim which comprises a rim base 43 having inwardly hooked flanges 44 formed at the edges thereof, these flanges engaging the endless reversible tire-retaining flanges 45. The rim base is preferably transversely split at one point, as will be hereinafter described. The rim base is provided with bearing surfaces of different diameters adapted to engage the bearing surfaces of different diameters formed upon the periphery of the wheel. As shown in the drawings, the rim base has two ribs 46 and 47 rolled therein, these ribs being preferably formed without thickening the metal of the rim, so that the rim base may be cold rolled from flat stock. The rib 47 is higher than the rib 46 and its outer surface forms a convex bearing surface 48 adapted to engage the bearing surface 41 at the edge of the felly band 38. The rib 46 is adapted to engage the bearing surface 40 of the felly band 38, the convex bearing surface 40 preferably engaging the concave surface 49 formed by the junction of the side of the rim 46 with the bottom of the rim base. By forming the bearing surfaces in the manner described, all of the bearing surfaces on the rim and felly band may be formed by the simplest cold-rolling operations, and yet a firm wedging engagement of the rim on the wheel may be secured, the contacting surfaces being of substantial area.

For securing the rim upon the wheel, means are provided for forcing the rim radially outward at intervals so as to cause the same to grip the periphery of the wheel between the points where the rim is forced out. In the form of my invention shown in Figs. 5 to 9, I provide for this purpose a number of studs passing radially through the wheel and felly and engaging the undersurface of the rim, these studs being directly supported upon a corresponding number of spokes. As shown in the drawings, four equally disposed studs 50 are provided. Each stud comprises a cylindrical shank having a head 51 shaped for engagement by a wrench or other means for turning the stud. Each stud has a screw-threaded socket 52 extending into the under-side thereof, the screw 53 permanently secured to the end of one of the spokes screwing into this socket. The screw 53 may be secured to its spoke in any suitable manner; for example, it may be carried by cap 54, which fits over the end of the spoke and is held in position by means of a pin 55. The end of the stud 50 and the under-surface of the rim are provided with suitable engaging means whereby the stud will lock the rim positively against lateral and circumferential movement. These engaging means may be of any suitable form; for example, as shown in Figs. 5, 7 and 9, a round-headed rivet 56 is secured to the rim base, the end of the stud having a depression 57 therein to receive this round head. The stud will thus hold the rim against lateral movement upon the wheel and thus insure the accurate centering of the rim, and will also prevent creeping of the rim and thus take the place of separate driving plates.

In the operation of my device, it will be understood that there is sufficient clearance between the bearing surfaces on the rim and the bearing surfaces on the felly band to permit the rim to be applied to the wheel, the valve-stem being "button-holed" through a hole in the felly. It will be understood that by providing the rim and felly band with bearing surfaces at each side of different diameters, the clearance necessary to permit the rim to be applied in this manner need be very slight. Only a fraction of the clearance is required to permit the rim to be applied to the wheel and removed when the separated bearing surfaces of different diameters are used, as compared with the clearance necessary if the rim and felly band are provided with cylindrical engaging surfaces or with separated bearing surfaces of equal diameter. The rim having been applied to the wheel, the radial studs 50 are rotated by means of a wrench applied to the heads thereof, the rotation of the studs causing them to unscrew from the fixed screws 53 and thus be forced positively in a direction radial from the hub. The studs are guided in their travel by the walls of the holes in the felly through which they slide, but the felly takes none of the radial stress which is transmitted directly to the spokes carrying the studs. The screwing out of the studs causes the recesses in the ends thereof to receive the rounded heads of the rivets 56 and thus guide the rim into alined position with the wheel, and finally to force the rim out at intervals and thus take up the clearance between the rim and wheel and cause the bearing surfaces on the rim to tightly clamp the bearing surfaces on the felly band. To remove the rim from the wheel it is only necessary to screw the studs down on the screws 53, thus disengaging them from the rivets 56 and permitting the rim to assume its normal shape. The rim is then free to be removed.

In Figs. 5 to 8 I have illustrated a modified manner of transversely cutting the rim base, the ends of the rim base when in engagement being thereby held against radial displacement in either direction and also against circumferential contraction. As shown in these figures, a cut 58 inclined in one direction to a radius is made half-way across the rim base, a second cut 59 alined with the cut 58 but inclined in the opposite direction to a radius being made across the other half of the rim base. The planes of the faces formed by these cuts on each end of the rim are thus oppositely inclined with respect to adjacent axial planes, and the ends of the rim base thus engage in mutually interengaging intersecting planes. These two cuts being alined join in the middle so that the rim base is entirely severed, but the bevel of the two cuts being opposite, a portion or tongue of each end of the rim base overhangs a portion of the opposite end of the rim base so that the ends of the rim base are effectually interlocked against radial displacement. It will be noted that the axis of symmetry of the cut here is also diagonal. In order to separate the ends of the rim base it is necessary to offset one end of the same laterally with relation to the other, as indicated in dotted lines in Fig. 7. The ends of the rim base can then be telescoped and the rim base collapsed sufficiently to permit the endless flanges 45 engaging the tire to be removed. The operation of this rim base is similar to the one heretofore described and to that of the tire-carrying rim described and claimed broadly in my application Serial No. 628,386, filed May 20, 1911, (Patent No. 1,177,457), but the device here shown is of exceedingly simple construction, as the desired result is obtained by simply sawing the rim base half-way across in planes inclined in opposite directions to a radius. As will be understood, the ends of the rim are normally held against lateral displacement by means of the endless flanges 45 which are forced against the inwardly projecting flanges 44 by means of air pressure in the tire, the said flanges also preventing circumferential separation of the rim ends.

In Figs. 10 and 11 I have shown a further modification of the structure shown in Figs. 7 and 8. As shown in these figures, 60 is a rim which is severed half-way across by a cut 61 disposed in a plane at an angle to a radius, the other half of the rim being divided by a cut 62 oppositely inclined to a radius. The general direction of the line of division of the rim is oblique to the edges of the rim. This is also true of the form of rim shown in Fig. 4; but in the rim shown in Figs. 10 and 11 the ends of the two cuts 61 and 62 overlap, so to speak, to provide central shoulders 63. The diagonal oppositely inclined planes of the faces of each end of the rim meet at a point in the medial plane of the rim about midway of the thickness of the rim, and by virtue of the offset position of these planes they form crooked lines with the upper and lower surface of the rim, respectively, each line consisting of two parallel offset portions with an intermediate central portion, the latter being substantially parallel to the edges of the rim. In the form illustrated in Fig. 7, the two cuts extend in opposite directions from a central line, so that no shoulder corresponding to the shoulder 63 is formed. The shoulders 63 prevent the relative lateral displacement of the ends of the rim 60 in either direction. The general obliquity of the cut in the rim to the edges of the rim prevents the lateral displacement of the ends in one direction, but this need not be relied on with the rim cut to provide the interlocking shoulders 63 which prevent movement in either direction. The split need not therefore be oblique. The opposite bevels of the two portions of the cut in the rim prevent the relative radial displacement of the ends of the rim in either direction. It will thus be seen that the ends of the rim are effectually interlocked against displacement in any direction except circumferentially; that is, the ends of the rim can not slide by each other, but may be separated only by being drawn directly apart as illustrated in Fig. 11. For purposes of illustration the rim 60 has been shown in Figs. 10 and 11 as provided with integral tire-retaining flanges 64 instead of with endless separable tire-retaining flanges as illustrated in Fig. 9. Division having been required herein between the separate species of interlocking means shown in the drawings, the claims to the species shown upon Sheet 1 herein and directed to the means whereby locking against circumferential as well as radial separation is secured, have been incorporated in a divisional application filed November 24, 1915, Serial Number 63,152. Claims relating generically to a split rim whose opposed ends present means interlocking against radial separation and operable by relative lateral movement, have been retained herein together with claims to the particular species thereof shown upon Sheet 2 of the drawings, in which the rim is shown as split along a cut, which cut, on the top or bottom of the rim, or on both, appears as a broken line, each rim end lying in three planes and constituting thereby interlocking tongues, and which split is referred to in the specification, with particular reference to Figs. 10 and 11, as a "crooked line."

Having thus described certain preferred embodiments of my invention, but without desiring to limit myself to the specific details described and illustrated any further than as specified in the claims hereunto appended, I claim:

1. A diagonally split rim having laterally interlocking ends, said ends lying in a plurality of intersecting planes.

2. A demountable rim having a diagonal split providing laterally interlocking ends, said ends lying in a plurality of non-parallel planes.

3. A diagonally split demountable rim providing laterally interlocking opposed faces registering in a plurality of planes, each plane being angularly disposed relatively to adjacent planes.

4. A tire-carrying rim for vehicle wheels comprising a ring carrying tire-engaging means, said ring being transversely split along a broken line, so as to provide laterally engageable interlocking tongues at the ends of the rim, the engaging faces of the tongues being oblique with respect to the sides of the rim.

5. A tire-carrying rim for vehicle wheels comprising a ring and endless tire-retaining flanges, the ring being transversely split along a broken line so as to provide laterally engageable interlocking tongues at the ends thereof, the engaging faces of the tongues being oblique with respect to the sides of the rim.

6. A tire-carrying rim for vehicle wheels, comprising a rim base having flanges formed at the edges thereof, said rim base being divided transversely in a general direction oblique to the edges of the rim base, the division being formed by two cuts, each extending approximately half-way across the rim base, the planes of said cuts being inclined in opposite directions to a radius.

7. A split rim having obliquely disposed laterally interlocking members adapted to engage by a relative lateral movement of the rim ends.

8. An integrally flanged demountable tire-carrying rim opened at one place by offset cuts extending from a point on one edge of the rim to a circumferentially advanced point on the other edge of the rim, the ends formed by said cuts presenting faces lying in three planes formed by two transverse cuts, both of which are oblique to a radial plane and angularly disposed relatively to each other, and by a third cut in the general direction of the plane of the wheel and connecting the other two.

9. A split rim whose opposed ends have complementary surfaces, the surfaces of each end lying in three planes having a common point.

10. An integrally flanged demountable tire-carrying rim opened at one place by a transverse cut extending from a point on one edge of the rim to a circumferentially advanced point on the other edge of the rim, the ends formed by said cut being provided with mutually interlocking surfaces inclined obliquely to the radial planes normal to the plane of the rim adjacent thereto.

11. A diagonally split demountable rim, the opposed faces of whose ends are made up of a plurality of planes, said planes being oblique with respect to adjacent radial planes normal to the plane of the rim and certain of said planes being oppositely inclined with respect to certain other of said planes.

12. A diagonally split demountable rim, the opposed faces of whose ends are made up of a plurality of mutually interengaging surfaces, each of said surfaces comprising two oppositely inclined faces oblique to radial planes normal to the plane of the rim adjacent thereto, said faces being inclined with respect to one another and intersecting one another at approximately the medial plane normal to the plane of the rim.

13. A demountable tire-carrying rim transversely split on a broken line formed by three cuts, two upon intersecting secant planes and the third connecting them.

14. A demountable tire-carrying rim transversely split upon secant planes intersecting in the rim and upon a median plane at the intersection of said secant planes to form lateral stop faces.

15. A demountable tire-carrying rim transversely cut on secant planes diagonally intersecting in the rim and upon a median plane at the intersection of the said secant planes to form a plurality of opposed faces preventing both lateral and radial relative motion of the rim ends in either direction.

JAMES H. WAGENHORST.

Witnesses:
WALTER C. MEANS,
ILLA N. KIRN.